(12) United States Patent
Bellessort et al.

(10) Patent No.: US 8,751,678 B2
(45) Date of Patent: Jun. 10, 2014

(54) METHOD OF GENERATING A WEB FEED AND AN ASSOCIATED SYSTEM

(75) Inventors: Romain Bellessort, Rennes (FR); Youenn Fablet, La Dominelais (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 12/940,545

(22) Filed: Nov. 5, 2010

(65) Prior Publication Data
US 2011/0106967 A1  May 5, 2011

(30) Foreign Application Priority Data

Nov. 5, 2009 (FR) ..................................... 09 57849

(51) Int. Cl.
*G06F 15/16* (2006.01)
(52) U.S. Cl.
USPC .......................................... 709/231; 707/748
(58) Field of Classification Search
None
See application file for complete search history.

(56) References Cited

U.S. PATENT DOCUMENTS

| | | | |
|---|---|---|---|
| 8,255,521 B1 * | 8/2012 | Natarajan et al. ............. | 709/224 |
| 2006/0026113 A1 | 2/2006 | Omoigui | |
| 2007/0260586 A1 | 11/2007 | Savona | |
| 2008/0244091 A1 * | 10/2008 | Moore et al. .................. | 709/246 |
| 2009/0327320 A1 * | 12/2009 | Yan et al. ...................... | 707/101 |
| 2010/0057835 A1 * | 3/2010 | Little ............................ | 709/203 |
| 2010/0083124 A1 * | 4/2010 | Druzgalski et al. ........... | 715/738 |

FOREIGN PATENT DOCUMENTS

EP  2 110 760  10/2009

OTHER PUBLICATIONS

Ian Garcia, et al., "Eliminating Redundant and Less-Informative RSS News Articles Based on Word Similarity and a Fuzzy Equivalence Relation", 18th IEEE International Conference, Nov. 1, 2006, pp. 465-473.
French Search Report dated May 18, 2010 issued during prosecution of related French application No. 0957849.
U.S. Appl. No. 12/940,540, filed Nov. 5, 2010.

* cited by examiner

*Primary Examiner* — Ario Etienne
*Assistant Examiner* — Clayton R Williams
(74) *Attorney, Agent, or Firm* — Fitzpatrick, Cella, Harper & Scinto

(57) ABSTRACT

The present invention concerns a method of generating a syndication web feed (10) composed of entries (12) corresponding to content elements, and an associated system.
The method comprises the steps consisting of:
  determining (E110, E221, E300) at least one activity parameter (A) representing a frequency of obtaining content elements to be published;
  calculating (E620, E770) at least one similarity value (SI) between a content element (IT) to be published in the web stream (10) and at least one entry (E) in said web stream;
  selecting (E130, E640) an entry (EP) in said web stream according to the at least one calculated similarity value (SI) and the at least one determined activity parameter (A);
  adding (E140) said content element to be published (IT) to said selected entry.

16 Claims, 10 Drawing Sheets

```
<?xml version="1.0"?>
<rss version="2.0">
    <channel>
        <title>Liftoff News</title>
        <link>http://liftoff.msfc.nasa.gov/</link>
        <description>Liftoff to Space Exploration.</description>
        <language>en-us</language>
        <pubDate>Tue, 10 Jun 2003 04:00:00 GMT</pubDate>
        <lastBuildDate>Tue, 10 Jun 2003 09:41:01 GMT</lastBuildDate>
        <docs>http://blogs.law.harvard.edu/tech/rss</docs>
        <generator>Weblog Editor 2.0</generator>
        <managingEditor>editor@example.com</managingEditor>
        <webMaster>webmaster@example.com</webMaster>
        <item>
            <title>Star City</title>
            <link>http://liftoff.msfc.nasa.gov/news/2003/news-starcity.asp</link>
            <description>How do Americans get ready to work with Russians aboard
the International Space Station? They take a crash course in culture, language
and protocol at Russia's <a
href="http://howe.iki.rssi.ru/GCTC/gctc_e.htm">Star
City</a>.</description>
            <pubDate>Tue, 03 Jun 2003 09:39:21 GMT</pubDate>
            <guid>http://liftoff.msfc.nasa.gov/2003/06/03.html#item573</guid>
        </item>
    </channel>
</rss>
```

```
<?xml version="1.0" encoding="utf-8"?>
<feed xmlns="http://www.w3.org/2005/Atom">

<title>Example Feed</title>
    <link href="http://example.org/"/>
    <updated>2003-12-13T18:30:02Z</updated>
    <author>
        <name>John Doe</name>
    </author>
    <id>urn:uuid:60a76c80-d399-11d9-b93C-0003939e0af6</id>

<entry>
        <title>Atom-Powered Robots Run Amok</title>
        <link href="http://example.org/2003/12/13/atom03"/>
        <id>urn:uuid:1225c695-cfb8-4ebb-aaaa-80da344efa6a</id>
        <updated>2003-12-13T18:30:02Z</updated>
        <summary>Some text.</summary>
    </entry>

</feed>
```

```
<?xml version="1.0"?>
<rss version="2.0">
   <channel>
      <title>Liftoff News</title>
      <link>http://liftoff.msfc.nasa.gov/</link>
      <description>Liftoff to Space Exploration.</description>
      <language>en-us</language>
      <pubDate>Tue, 10 Jun 2003 04:00:00 GMT</pubDate>
      <lastBuildDate>Tue, 10 Jun 2003 09:41:01 GMT</lastBuildDate>
      <docs>http://blogs.law.harvard.edu/tech/rss</docs>
      <generator>Weblog Editor 2.0</generator>
      <managingEditor>editor@example.com</managingEditor>
      <webMaster>webmaster@example.com</webMaster>
      <item>
         <title>Star City</title>
         <link>http://liftoff.msfc.nasa.gov/news/2003/news-starcity.asp</link>
         <description>How do Americans get ready to work with Russians aboard
the International Space Station? They take a crash course in culture, language
and protocol at Russia's <a
href="http://howe.iki.rssi.ru/GCTC/gctc_e.htm">Star
City</a>.</description>
         <pubDate>Tue, 03 Jun 2003 09:39:21 GMT</pubDate>
         <guid>http://liftoff.msfc.nasa.gov/2003/06/03.html#item573</guid>
      </item>
   </channel>
</rss>
```

Figure 1a

```
<?xml version="1.0" encoding="utf-8"?>
<feed xmlns="http://www.w3.org/2005/Atom">

<title>Example Feed</title>
   <link href="http://example.org/"/>
   <updated>2003-12-13T18:30:02Z</updated>
   <author>
      <name>John Doe</name>
   </author>
   <id>urn:uuid:60a76c80-d399-11d9-b93C-0003939e0af6</id>

<entry>
      <title>Atom-Powered Robots Run Amok</title>
      <link href="http://example.org/2003/12/13/atom03"/>
      <id>urn:uuid:1225c695-cfb8-4ebb-aaaa-80da344efa6a</id>
      <updated>2003-12-13T18:30:02Z</updated>
      <summary>Some text.</summary>
   </entry>

</feed>
```

Figure 1b

```
<entry>
    <title>[International news summary] New government in Switzerland(+ 3 other
                                    International news summaries)</title>
    <id>http://example.org/news summary/international/3</id>
    <content type='xhtml'>
        <div xmlns='http://www.w3.org/1999/xhtml'>
           <p>3 other international news summaries :
<a href='http://example.org/news summary/international/2'>Conflicts in Somalia</a>
<a href='http://example.org/news summary/international/1'>Floods in China</a>
<a href='http://example.org/news summary/international/0'>Elections in Peru</a>
           </p>
        </div>
    </content>
</entry>

<entry>
       <title>[Dossier] Middle East (+ 3 other dossiers)</title>
    <id>http://example.org/dossier/international/1</id>
    <content type='xhtml'>
       <div xmlns='http://www.w3.org/1999/xhtml'>
          <p>3 other dossiers :
<a href='http://example.org/dossier/france/0'>University reform</a>
<a href='http://example.org/dossier/sport/0'>Olympic Games</a>
<a href='http://example.org/dossier/international/0'>Energy crisis</a>
          </p>
       </div>
    </content>
</entry>
```

Figure 2 (suite)                           (d)

```
<entry>
    <title>[International news summary] New government in Switzerland(+ 3 other
                                    international news summaries )</title>
    <id>http://example.org/new summary/international/3</id>
    <content type='xhtml'>
        <div xmlns='http://www.w3.org/1999/xhtml'>
           <p>3 other international news summaries:
<a href='http://example.org/news summary/international/2'>Conflicts in Somalia</a>
<a href='http://example.org/news summary/international/1'>Floods in China</a>
<a href='http://example.org/news summary/international/0'>Elections au Peru</a>
           </p>
        </div>
</content>
<sx:sync id='EN001' updates='4'>
    <sx:history sequence="4" when="2009-07-21T09:55:00Z" by="ID0001"/>
    <sx:history sequence="3" when="2009-07-21T09:45:00Z" by="ID0001"/>
    <sx:history sequence="2" when="2009-07-21T09:20:00Z" by="ID0001"/>
    <sx:history sequence="1" when="2009-07-21T09:10:00Z" by="ID0001"/>
</sx:sync>
</entry>
```

Figure 11

METHOD OF GENERATING A WEB FEED AND AN ASSOCIATED SYSTEM

This application claims priority from French patent application No. 0957849 of Nov. 5, 2009, which is incorporated herein by reference

FIELD OF THE INVENTION

The present invention concerns a method of generating a web feed and an associated system.

BACKGROUND OF THE INVENTION

Web feeds, in particular syndication web feeds, are widely used on the internet in particular, for informing users on the content available (summary of articles published on the website) in order to advise them on the updating of contents (photographs, updating of software, etc) on a website or for delivering structured information such as weather forecasts. These feeds are generally published by the website in question and accessible to users who have subscribed to these feeds, through in particular a web feed aggregator or a web feed reader.

Web feeds take the form of a document, generally based on the XML ("eXtensible Markup Language") format, defining in a first part a set of properties relating to this feed (for example its name, the address at which it can be found, or the date of last updating), and then, in a second part, a set of entries associated with the contents.

Each entry of the web feed describes content elements (or "items") by means of a unique identifier within the web feed and information relating to the content: for example, a publication date, a title, possible a summary and other details. Thus each entry represents one or more content elements (article, photograph, etc) published on one or more web servers.

Because these web feeds are written in a standard XML format intended to describe the publication of a content, the web feeds can easily be processed by applications, unlike HTML ("HyperText Markup Language") files that are displayed in a web browser when an internet site is consulted.

Applications have thus been able to see the light of day, for example the one by means of which an internet site automatically displays, on its own pages, a summary of the contents published on another website. By virtue of the web feed, this application has become easy to set up, since it consists, for the first internet site, simply of recovering the web feed from the other site by a conventional subscription and thus obtain a summary of the content of the other site.

Equally, the establishment of feed readers offers many possibilities for a user. A feed reader is a program to which the user will indicate certain web feeds to be monitored. This is what is called subscribing to a web feed.

The reader is then responsible for periodically recovering the web feed for the purpose of determining whether updates have been made. Where applicable, the feed reader can indicate to the user, for example by means of a dedicated display, that new data are available.

The reader can also directly display the website as periodically recovered, thus offering applications of the weather forecast, stock exchange, latest news, etc.

A notable advantage of the web stream is that, by subscribing, the user no longer has any need to go to each site in order to check whether updates have been made. This is because it suffices for him to consult his feed reader and, if some updates interest him, he can then go to the site concerned in order to obtain more details, possibly via a link directly integrated in the entries of the web feed.

The main web feed standards are known by the term RSS, standing for "Really Simple Syndication", in the RSS version 2.0, and Atom (RFC 4287 of the IETF).

FIG. 1a shows an example of an RSS feed, in which an entry <item> (corresponding to a content element) comprises a title <title>, a link <link> (the address at which the resource can be consulted), a description <description>, a publication date <pubDate> and an identifier <guid>.

FIG. 1b shows an example of a web feed according to the Atom concurrent format, in which the presence is observed, within an entry <entry>, of a title <title>, a link <link>, an identifier <id>, an update <updated>, and a summary <summary>. The Atom format was developed to solve certain problems inherent in the RSS format, in particular concerning the data contained, the type of which can be indicated with Atom, or vis-à-vis the management of the content in several languages.

In order to guarantee effective consultation of the entries of the feeds and not overload the users with an excessive amount of information, these web feeds generally contain a limited number of entries. For example, with a limit of 20 entries, the web feed in question contains the last 20 elements of contents published.

In the mechanisms currently used, the updating of the web feed consists of adding new entries corresponding to the content elements to be published (those that have never been inserted in the web feed) as soon as these are available.

This poses a problem when content elements to be published arrive in large numbers, since the corresponding entries are then not intended to remain in the web feed for a long time. The visibility of the content elements to be published for subscribers is then seriously degraded.

For example, if there are 100 content elements to be published, only the last 20 are added to the web feed with the conventional mechanisms. Likewise, if 100 contents to be published are obtained successively, each new content to be published being obtained after a short interval of time (for example 1 minute), then the first 80 entries corresponding to the first 80 contents to be published will be only briefly presented in the feed (if a new entry is obtained at each minute, then the first 80 entries will be visible only for 20 minutes). Consequently, in both cases, it can be estimated that 80 entries do not benefit from sufficient visibility. This is because the period of consultation of a web feed by a user is generally greater than this visibility period.

Mechanisms are also known for dispensing with this barrier of 20 entries in order to broadcast information relating to a larger number of contents, in particular by grouping together several content elements in a single entry, or several entries in a single entry.

This is the case with feed aggregators that group together several web feeds in a single feed.

In a similar fashion, the site FeedStomper.com generates, from a given web feed, another web feed containing, for each day, all the new contents to be published for the day.

These approaches are however defined statically and do not make it possible to take account of the dynamics of creation of new contents to be published in order to adapt to them in particular.

The present invention aims to mitigate the drawbacks of the prior art, in particular in order to promote the rapid and visible publication of the contents in a web feed.

SUMMARY OF THE INVENTION

To this end, the invention concerns in particular a method of generating a syndication web feed composed of entries corresponding to content elements, the method comprising the steps consisting of:
  determining at least one activity parameter representing a frequency of obtaining of content elements to be published;
  calculating at least one similarity value between a content element to be published in the web feed and at least one entry of said web feed;
  selecting an entry of said web feed according to the at least one calculated similarity value and according to the at least one determined activity parameter;
  adding said content element to be published to said selected entry.

In this way it can be seen that, according to the invention, content elements can be grouped in the same entry of the web feed. A higher number of elements can thus be included in the feed without for all that impairing its legibility.

According to the invention, a similarity between the contents of the entries and the content element to be published is calculated in order to identify an entry that is particularly relevant with regard to the homogeneity of the contents that it will in the end comprise after grouping. The result is better visibility of the contents of the feed for the subscriber.

Moreover, the invention makes it possible to adapt the grouping strategy according to the activity of obtaining new content elements to be published in order for example to favor groups in a period of high activity and to enable more easily the creation of new entries in a period of low activity.

The invention thus may offer an immediate publication of new contents while ensuring that the contents remain consultable and therefore visible in the web feed despite the massive arrival of content elements to be published.

According to an embodiment of the invention, provision can be made for the method to comprise the identification of an entry from the said similarity values, for example the entry having the greatest similarity with the new element, and then the determination, according to at least one activity parameter, of the opportunity to group said element to be published with said entry identified, in order for example to perform the grouping in the case of high activity. This embodiment has the advantage of having simple complexity with in particular the application of the activity parameter solely to a single entry, the one identified.

In a variant, said selection comprises the determination of the entry having the highest similarity value with the content element to be published, this higher similarity value being greater than at least one similarity threshold relating at least to this entry. This embodiment, more complex since it requires comparing (possibly indirectly) each entry with the activity parameter or parameters, has the advantage of targeting the selection not necessarily to the entry with the best similarity but to the one that offers the best compromise between similarity and related activity. It applies in particular to the case where the step consisting of selecting comprises the comparison of the similarity value with at least one similarity threshold that is a function of the said activity parameter.

In an embodiment of the invention, a particular similarity threshold is associated with each entry of the web stream, and the said selection comprises the comparison of at least one said similarity value calculated for an entry with said particular threshold associated with this entry. This provision makes it possible to take account of the homogeneity of the contents described for each entry (corresponding to the particular threshold) so as not to add a new dissimilar element to this entry when the contents already in this entry have a high similarity.

According to one feature of the invention, the said content elements are organized by classes and at least one said class is associated with each entry of the web feed according the content elements corresponding to this entry. In addition, there is associated with each class a similarity threshold that depends on an activity parameter relating to said class, and said selection of an entry depends on the class similarity thresholds. By way of illustration, a class can be a category qualifying a content (for example a photograph/article), a sub-category of such category (for example an editorial/news summary/dossier), or any other attribute of the content elements (for example the address of the resource corresponding to the element).

By adjusting the thresholds according to the activity of each contents class, this approach makes it possible to control the grouping of contents so as to avoid grouping an element belonging to classes of low activity with an entry containing only contents belonging to classes of high activity. In this way sufficient similarity is maintained between the elements of the same entry.

In particular, the similarity threshold associated with a class is updated according to a relationship between the activity parameter relating to said class and an average activity parameter relating to an average activity of all the classes. This makes it possible to more or less favor the grouping of certain classes according to their respective activities. In particular, by lowering a similarity threshold, it is possible to make the groupings within this class more frequent, for example if contents of this class are less frequently obtained.

According to a particular feature of the invention, the method comprises the grouping of entries associated with a class in the same entry when the similarity threshold associated with this class decreases. This is because, since the threshold decreases, the content elements corresponding to the entries to be grouped can henceforth be sufficiently similar with regard to the new threshold.

Generally the reduction in the threshold results from a reduction in the activity relating to the associated class. Thus, since the proportion of new content elements to be published of this class tends to decrease, they can be grouped in a smaller number of entries.

According to a particular feature, the method comprises the separation of an entry associated with a class into a plurality of entries when the similarity threshold associated with this class increases. It is a case here of the reverse effect that makes it possible to make groupings finer, when the activity of a class increases.

In particular, the content elements corresponding to said entry to be separated are separated into a first group of content elements the similarity value of which with the said entry is greater than or equal to the new similarity threshold, and a second group of content elements the similarity value of which is lower than the new similarity threshold. This makes it possible to keep a highly homogeneous entry. Various processing operations can moreover be performed on the second group of elements in order to form other entries or to complete other already existing entries.

In particular, another entry of the web feed is selected from similarity values between the entries of the web feed and an element of said second group and from similarity thresholds associated with said entries of the web feed. Thus it is attempted to reintegrate the content elements of the second group in the other existing entries of the feed according always to a similarity approach.

According to another particular feature, the method comprises the grouping, in the same entry of the web feed, of several entries the associated activity parameters of which are the lowest. Here the least active classes are considered to form a single class. Thus the number of entries of the feed used for these different classes is limited, and therefore the number of entries available for the most active classes is increased, so as to obtain a better visibility of the contents.

In one embodiment, the said at least one similarity threshold increases when a frequency of obtaining the content elements to be published decreases. This is because, in the absence of activity, the entries have been presented in the feed for longer, and therefore the elimination thereof by insertion of a new entry is not detrimental with regard to the visibility of the content for the subscribers. It therefore appears that a greater similarity can be implemented in order to identify an entry and to proceed with any grouping with a new content element to be published.

In one embodiment of the invention, the said at least one similarity value is calculated from at least one content element attribute chosen from the set consisting of a title, a web address at which the content element can be consulted, a key word, a content category, and information on the origin of the content element.

In particular, the calculation of a similarity value with an entry comprises the comparison of at least one attribute of the content element to be published with the corresponding attribute of each of the content elements corresponding to said entry. It is possible for example to count the average number of positive comparisons. This implementation remains relatively simple.

According to a particular characteristic, the content elements are organized in hierarchical categories, and said similarity value with an entry corresponds to the number of hierarchical levels in common between the content element to be published and at least one content element corresponding to said entry.

In one embodiment of the invention, said selection of an entry depends on an indication of seniority of the entries of said feed. This indication can in particular be the period elapsed since the publication of the oldest element described by the entry in question. Thus it becomes easy to put in place a strategy preventing the grouping on "old" entries for the purpose of avoiding grouping indefinitely on a given entry.

Symmetrically, when no entry is selected, the method comprises the addition, in the web feed, of a new entry corresponding to said content element to be published. In this case, this addition can consist of the replacement of the oldest entry of the web feed (generally according to the period elapsed since the publication of the most recent element described by the entry) with this new entry.

Correspondingly, the invention concerns a device for generating a syndication web feed composed of entries corresponding to content elements, the device comprising:
- a determination means able to determine at least one activity parameter representing a frequency of obtaining content elements to be published;
- a calculation means able to calculate at least one similarity value between a content element to be published in the web feed and at least one entry of said web feed;
- a selection means able to select an entry of said web feed according to the at least one calculated similarity value and according to the at least one determined activity parameter;
- an addition means able to add said content element to be published to said selected entry.

The web feed generating device has features and advantages similar to the generation method according to the invention.

Optionally, the device can comprise means relating to the features of the generation method disclosed previously.

An information storage means, possibly totally or partially removable, able to be read by a computer system, comprises instructions for a computer program adapted to implement the generation method according to the invention when this program is loaded into and executed by the computer system.

A computer program, able to be read by a microprocessor, comprises portions of software code adapted to implement the generation method according to the invention, when it is loaded into and executed by the microprocessor.

The information storage means and computer program have features and advantages similar to the methods that they implement.

BRIEF DESCRIPTION OF THE DRAWINGS

Other particularities and advantages of the invention will also emerge in the following description, illustrated by the accompanying drawings, in which:

FIGS. 1a and 1b show two examples of a web feed respectively according to the RSS format and according to the Atom format;

FIG. 11 illustrates the use of the invention in the context of the FeedSync format for synchronization of different versions of a web feed.

DETAILED DESCRIPTION OF EMBODIMENTS OF THE INVENTION

Figure 2:
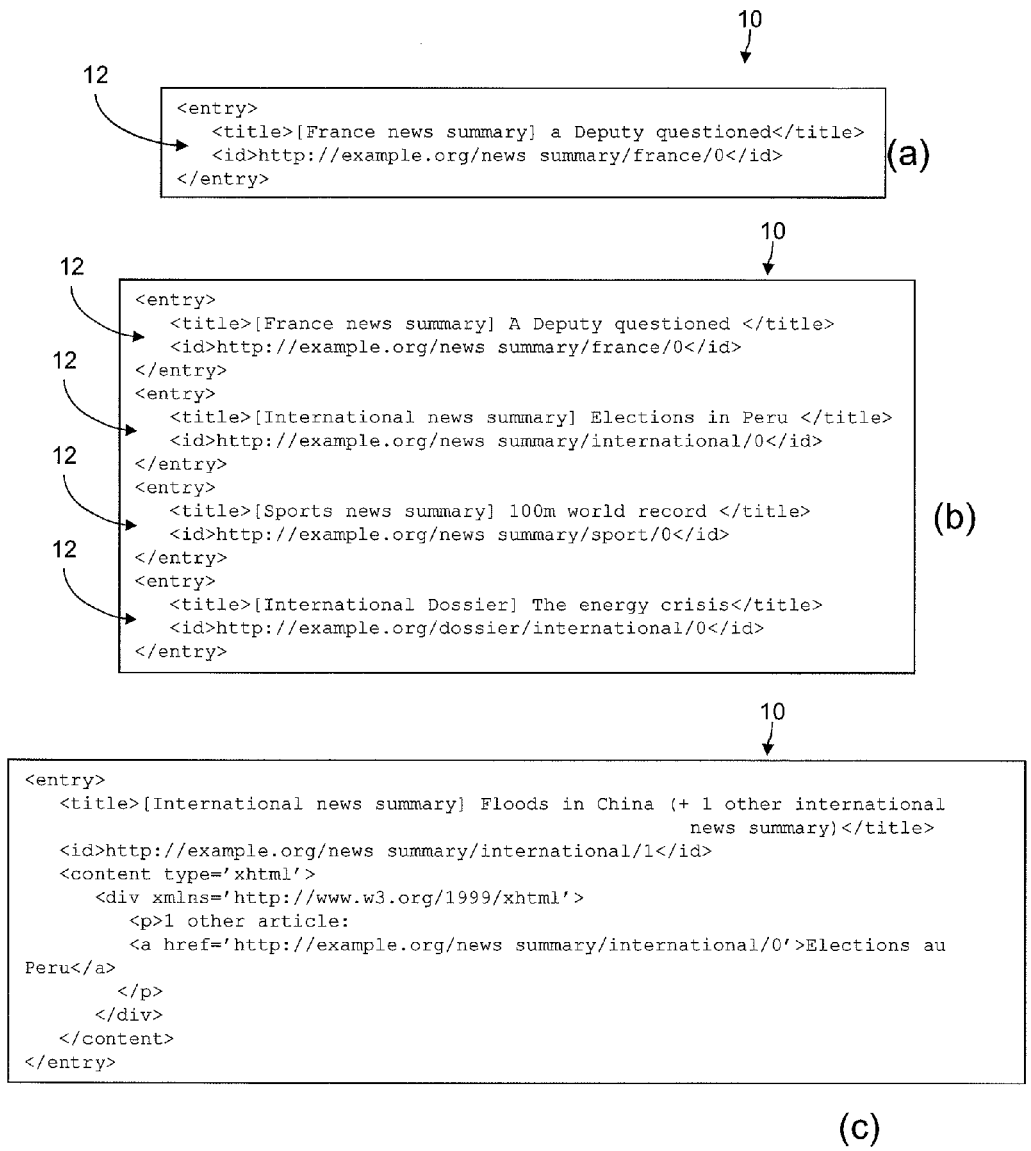
FIG. 2 illustrates an example of implementation of the present invention.

With reference to FIG. 2, the invention is first of all illustrated by an example in which a web feed 10 is limited to 25 entries (partial representation) and its entries describe publication articles.

For the present example, the articles are organized in a hierarchical system of categories, defined by two hierarchical levels:

either the article is a news summary (first hierarchical level), each news summary being able to relate to French news, international news, or sports news (three sub-categories—second hierarchical level);

or the article is a dossier (first level), each dossier also being characterized by one of the sub-categories "French", "international" or "sports news".

Then a measurement of similarity between two articles is defined, which reflects the hierarchical concordance between these two articles, for example:

two articles not having the same main category (a news summary and a dossier) have a similarity of 0;

two articles having the same main category (two news summaries or two dossiers) but different sub-categories have a similarity of 0.5;

two articles having the same main category and the same sub-category have a similarity of 1.

Initially, it is assumed that the web feed 10 generated by a server is empty. The articles in each category are not all published at the same frequency. In our example, the second hierarchical level (within a category, the sub-categories) is equitably distributed for each category; on the other hand, distribution within the first hierarchical level is unbalanced: for five articles, five are news summaries, and only one a dossier.

The server then receives a first article to be published, in particular a news summary relating to French news. Since there exists no entry in the feed, it creates a new entry 12, in the web feed 10, to describe the news summary (FIG. 2a).

In the entries shown in FIG. 2, some details of the RSS or Atom standards have been omitted for purposes of clarity of the explanations.

Next the server receives a second news summary, relating this time to international news.

A similarity value is then calculated between this new content element to be published in the web feed 10 and the already existing entry in said web feed. By comparison with the first news summary received, the similarity measurement determined is equal to 0.5.

An activity parameter (A) representing the frequency of obtaining the content element to be published, here in relation to the categories, is also determined. Thus the activity relating to the category "International news summary" is equal to 1 (only one article in this category was received during the analysis period), which is equal to the average activity (two articles received for two categories).

Consequently, since the "International news summary" activity is not substantially lower than the average activity, there is no need to group the new news summary with the existing news summary, their similarity being only 0.5. A new entry describing this news summary is therefore added.

Subsequently, a third content, here a sports news summary, is published, then a fourth, here an international dossier.

As for the addition of the second news summary, there is on each occasion at least one different category (similarity measurement ≤0.5) and the activity in each category is equal to 1, equal moreover in this case to the average activity. New entries 12 are therefore created for each of these new articles (FIG. 2b).

Subsequently, new news summaries to be published are received: there necessarily exists an entry for which the measurement of similarity is equal to 1 since there exists an entry for each news summary sub-category.

However, to know whether the various news summaries in the same category are grouped together or not, the criterion of the activity intervenes.

This is because a grouping is done only if the activity is sufficiently great (otherwise the basic use of the feed, with one entry per article, makes it possible to store the articles for a period deemed to be sufficiently long). That is to say, if the general reception activity is below a threshold value, the groupings can be blocked: for example, when receiving 20 contents to be published per day, it is not necessary to proceed with a grouping for a daily web feed having 20 entries.

Here it is assumed that the various articles are submitted in a short interval of time (for example on average, one article every 10 minutes constituting for example a high activity), so that, if there were one entry per article, the feed would correspond only to a fraction of the current day, which is deemed to be insufficient.

Consequently, if a new international news summary is received, it is grouped with the existing international news summary (FIG. 2c). For this purpose, an entry of said web feed is selected from similarity measurements (equal to 1 for the "international news summary") and the activity parameter (equal to 1 for each of the entries).

The grouping, as illustrated in FIG. 2c, consists of adding the content element to be published to the selected entry, here the existing "international news summary" entry, in particular to describe the two articles in a single entry.

It is particularly advantageous to choose the last article added as the main article in the grouping (use of the title, in particular, as an element of the title of the entry), and the tag <content> in the case of an Atom feed (<description> in the case of an RSS feed) to describe the other articles already present in the modified entry 12).

In this example, the article is described using the XHTML format, which makes it possible in particular to display the text of the title as well as a link to the article. Advantageously, the number of other articles grouped in this entry is included in the title.

On the basis of the rate and the distribution mentioned above (one article every 10 minutes, four news summaries for a dossier), the new articles received are therefore added. The calculation of the activity parameters of the category then quickly shows that the activity peculiar to each dossier category is appreciably less than the average activity.

In this case a reduction is made in the associated similarity threshold by means of which grouping in a category is enabled, for example by now taking 0.5 as the threshold. By choosing such a value as the similarity threshold for grouping a new article and an existing entry, it is decided that all the articles in the "dossier" category will be grouped together (indifferently of the sub-categories).

In this way, four types of entry are distinguished in the feed 10: one for each sub-category of news summary, and one for the three sub-categories of dossier.

Naturally, if the activity and the distribution of the new incoming articles were to change, the thresholds would be modified in order to adapt to this new activity.

Having regard to the distribution of the articles, each entry contains substantially the same number of articles. By way of illustration, FIG. 2d shows only one entry for several international news summaries and one entry for several dossiers.

It will thus be noted that the activity parameter makes it possible to adjust the similarity thresholds used during the selection of the "most representative" (or "closest") entry of the new article to be added to the web feed 10.

In this example, it is moreover possible to add a management of the oldest entries in order to avoid modifying them indefinitely. A maximum age is then defined for each entry 12 (the age of an entry being able in particular to be defined as the time elapsed since the publication of the oldest element described by this entry), for example 6 hours, beyond which groupings are prevented. It is thus ensured that all the articles in a category are not indefinitely grouped in a given entry. Without this "maximum age", a risk would be that the new articles are added in the four entries created without ever creating new entries or deleting any. However, this behavior is not effective with regard to the purpose of the web feeds, for which it is principally sought to represent only the articles published in the recent past (for example the last 24 hours or 48 hours).

In the light of this example (FIG. 2d for example), despite a fixed number of entries 12 in the web feed 10, the invention makes it possible to respond to a high frequency of reception of new contents by describing more contents than a conventional feed, while grouping them together by similarity and adjusting the way of grouping to the activity of the various categories.

For the user, this approach results in more chances of having each content appear in the feed, and better visibility for distinguishing the contents of interest than those that are not of interest.

This example makes it possible now to specify a few concepts used by the present invention.

Categories of article have been defined: news summaries/dossier, French/international/sports news.

For the remainder of the description, "classes" will be spoken of to define categories based on such criteria (if the elements are articles, it is possible to have editorials, news summaries, dossiers, etc, that is to say so many different categories), or on any other attribute or property of the content elements (for example from the address of the resource corresponding to the element, photograph or article). These classes thus define the categories or properties that are involved in the analysis of similarity (via thresholds) and on the basis of which the groupings of content elements are made as described hereinafter.

The classes can be organized hierarchically, as shown previously for the categories.

In addition, a content element may belong to different classes. The similarity threshold of this element, as described hereinafter, is then the maximum of the thresholds of the classes to which the element belongs (in this way, an entry satisfying the similarity threshold for the element in question will satisfy all the thresholds of the classes associated with the element).

In the simplest case, a single class is considered, and therefore a single activity and a single similarity threshold for all the content elements. However, if several element classes exist, one activity per class is distinguished, as well as one similarity threshold per class. Thus, by comparing the activity of a class with the activity of the other classes, it is possible to determine whether the threshold must be modified.

The activity is for its part a measurement representing the quantity of new content elements to be published that arrive, in particular by classes as defined above.

In a scheme of simple design, it can be seen as being a measurement of the number of content elements added to the feed during a certain period T, and it is therefore a case of a frequency (or rate) of obtaining content elements to be published. If a period of 24 hours is taken, then the activity is the number of content elements added to the feed during the last 24 hours. Thus, whenever a new element to be published is obtained, it is possible to calculate the activity over the analysis period T by calculating the number of elements received between the present time (t) and the time t−T.

Basically, there is therefore an activity describing the whole of the feed, but it is also possible, if element classes are defined, to have an activity particular to each class. In this case, this activity measures the number of elements in the class received between the present time (t) and the time t−T.

The choice of the period T makes it possible to adjust the reactivity to the arrival of the content elements to be published.

This is because the web feed 10 generated by the invention can vary substantially according to the choice of the period T. Thus, for a short period (for example 1 hour), the algorithm is relatively reactive since it takes into account only relatively recent data: there are therefore more chances of observing variations in activity, which modify the way in which the elements are grouped. Conversely, with a long period (for example 24 hours), the algorithm is less reactive, which makes it possible to have fewer variations in the measurement of the activity.

For example, for a feed for which, between 9.00 hours and 19.00 hours, there would be ten new elements to be published arriving per hour but none the rest of the time, then, with a period T of 1 hour, the activity would change from 10 at 19.00 hours to zero activity as from 20.00 hours. On the other hand, with a period of 24 hours the activity would vary less.

In a less minimalist scheme, the measurement of the activity is more complex. For example, a supplementary measurement may be made over a fraction of the period T in order to take account both of a recent activity and a more long-term activity. In this case, it is then possible to calculate an average activity from these two activities, possibly by weighting them in order to grant more importance to one or the other.

In particular, it is possible to use the recent activity as an indicator of the activity to come, and therefore for example to count it for three quarters in the measurement of the activity, as against one quarter for the more long-term activity (which introduces a degree of reliability).

Another possibility is to use statistics for obtaining more relevant activity values: thus statistics will make it possible to take into account and anticipate a drop in activity at certain periods (for example at night or weekends).

It has also been possible to see, in our example in FIG. 2, that a measurement of the similarity is made between a content element to be published (a news summary for example) and an entry 12 in the web feed 10.

In the illustrations that follow, the similarity measurement is made on properties of the content elements. For example, if the elements have a "key words" property containing a list of key words characterizing this element, then the similarity measurement can be made by comparison of these key words.

Between two elements, the measurement of the similarity is made by comparison of properties involved in the measurement. Typically, if for each property considered the two elements have the same value, then the similarity is equal to "1". Contrary to this, if the two elements have no common value among these properties, the similarity is equal to "0". Finally, in other cases, the similarities between these two values (for example 0.4 to characterize the case where two elements have 40% key words in common and only the key words are used to measure the similarity).

It is thus possible to define the similarity between a content element and an entry 12 in the web feed 10, as being the average of the similarities between this element and each of the elements described by this entry 12.

In other words, for an element to have a similarity of "1" with an entry 12, it is necessary for this element to have exactly the same values for all the properties involved in the measurements of the similarity as those of each of the elements described by the entry.

Contrary to this, in order to have a similarity of "0", it is necessary for the element to have a similarity of 0 with each of the elements described by the entry.

In the other intermediate situations, the similarity measurement will be between 0 and 1.

By way of illustration, a few examples of similarity measurements are now indicated.

In the case where the elements considered have key words and this property is used to measure the similarity, the similarity of an element and an entry 12 is zero if an element to be added and the elements described in an entry share no key word.

On the other hand, if the element to be added has exactly the same key words as those appearing in each element of the entry, then the similarity is equal to 1. Otherwise the element has a similarity that depends on the number of key words common between the element to be added and the elements of the entry.

According to another example, in the case where the elements are organized in hierarchical categories, two elements where the highest-level category is different have a zero similarity. On the other hand, the more common categories there are descending in the hierarchy, the higher the similarity. Finally, if the element and those of the entry belong to the same category as far as the lowest level, then the similarity is equal to 1.

A particular case of categories is the use of semantic descriptions of the elements. These descriptions can be produced by means of the RDF syntax and published by means of POWDER ("Protocol for Web Description Resources").

Finally, according to a third example, the addresses of the resource corresponding to the elements are compared. This is because the address of the resource corresponding to a content element can also supply indications on its nature, and therefore be relevant as an element for evaluating similarity. By way of illustration, having as the address of a photograph http://www.example.org/photo/123.jpg, and as the address of an article http://www.example.org/article/1, the prefix http://www.example.org/photo/ makes it possible to identify a photograph, while in the second the prefix http://example.org/article/ makes it possible to identify an article. It is therefore possible to establish a measurement of similarity restoring the similarity of the resource addresses as from the start of these.

When the entry serving for the grouping with the content element to be published is selected, a similarity threshold is involved, with which the similarity measurements thus made are compared. For implementation of the invention, this similarity threshold depends on the activity (possibly according to one approach per class).

According to a simple approach of the invention, if the similarity between a new element to be published and an entry is lower than this threshold, then the element and the entry will not be able to be described in the same entry. On the other hand, if the similarity is above this threshold, then the element and the entry, deemed "sufficiently" similar, will be able to be described in the same entry. It is moreover the adjustment of these thresholds that makes it possible to adapt to the variation in the frequency of obtaining new contents to be published.

More elaborately, a similarity threshold particular to the classes of elements and possibly a similarity threshold particular to each entry is distinguished.

Having one threshold per class of element makes it possible to ensure, for a class having a given activity, that an element of this class is not added to an entry the elements of which are insufficiently similar to the element to be added.

Conversely, considering one threshold particular to each entry makes it possible to prevent the addition of an only slightly similar element to an entry in the case where the elements of this entry are very similar to each other.

By way of example, if an element belonging to a class the activity of which is very low is considered, the similarity threshold required for this class will also be low. It may therefore be that, from the point of view of the element, the closest entry is an entry that is only slightly similar. However, if elements contained in this entry are very similar to each other, from the point of view of the entry, it is not advantageous to include this new only slightly similar element, since this amount to reducing the coherence of the elements contained. Consequently, in this case, the distinction of two types of similarity threshold makes it possible to consider, as close, an element and an entry only if the similarity is sufficient from the point of view of both the class and the entry.

A description is now given, with reference to FIGS. 3 to 10, of an embodiment of various processing operations for generating a web feed 10 according to the invention.

Figure 3:
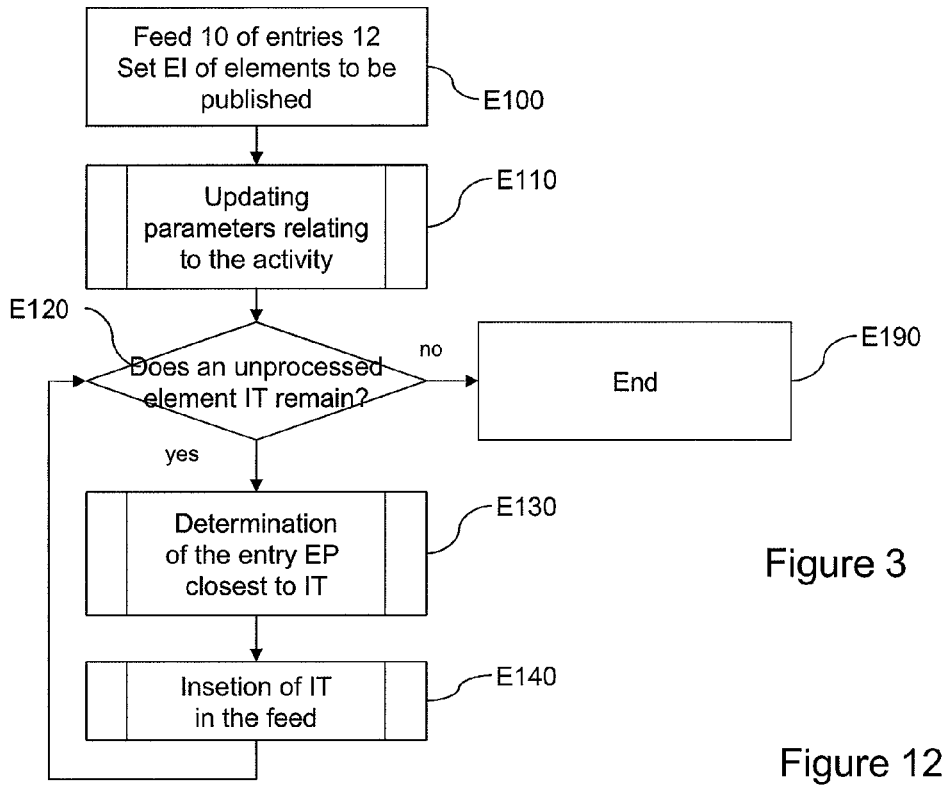
FIG. 3 shows, in the form of a flow diagram, general steps of generating a web feed according to the invention.

FIG. 3 describes the addition of a set of elements El to the web feed 10 of entries 12.

This addition begins at step E100 with the obtaining of the set El of the content elements to be published which are available and by the obtaining of the feed 10.

At step E110, the parameters relating to the activity (A) are updated, that is to say parameters describing the activity of the feed, but also parameters that depend on the activity, in particular the similarity thresholds used during the determination and selection of the "closest" entry to an element to be added. This is described in more detail with reference to FIG. 4.

At step E120, a test is carried out to see whether there remains a content element IT of the set El that is not processed.

In the affirmative, the entry EP "closest" to the element IT is determined, at step E130. This is described below with reference to FIG. 8.

In the example presented above, it could be noted that the determination of the entry EP depends on an activity parameter (A) of the feed (itself making the similarity thresholds vary), this activity being able to be general (activity of the whole of the feed) or particular to a class of elements (activity of the class). In particular, the same entry may, for two different values of the activity considered, be, in one case, the closest entry (best similarity value), and in the other, not be it because its similarity to the element IT does not reach the corresponding similarity threshold.

The processing continues at step E140 where the element IT is inserted in the web feed 10, according in particular to the previously determined entry EP.

This insertion is made either by the creation of a new entry describing the content element IT, or by the grouping of this element IT with the determined entry EP (this grouping being able to involve the creation of a new entry replacing EP, or the direct modification of the entry EP in order to insert therein the information of the element IT). These different cases are described hereinafter with reference to FIG. 10, which details step E140.

At the end of step E140, step E120 is returned to in order to process a following content element. When there are no more of these to process, the processing ends (step E190).

The following of the activity relating to the reception of new content elements to be published and the updating of related parameters is now described with reference to FIG. 4. It is a case in particular of the previously mentioned step E110.

The main objective of this updating is to adapt the similarity thresholds with which the similarity measurements are compared in order to identify the entry in the web feed "closest" to the element to be added. According to the invention, this adaptation takes account of the activity of receiving new content elements to be published since it is wished to be able to adjust the insertion of these elements in the web feed according to this activity.

Moreover, the adjustment of these thresholds may cause certain entries in the web feed to no longer satisfy them, in which case a processing on these entries is performed: grouping or separation of entries.

In detail, the corresponding processing commences at step E200 with the obtaining of the set El of content elements to be published.

At step E210, it is assessed whether an unprocessed element IT remains in the set El.

In the affirmative, the classes associated with the element IT are obtained during step E220, and then their respective activities (A) are calculated, during step E221. A few examples of activity measurements were given previously (for example, number of elements in the class in question received during an analysis period T=frequency or rate of obtaining the contents to be published).

The particular threshold of each of these classes is then updated during step E222, a more detailed description of which is supplied below with reference to FIG. 5.

It should be noted that, in the case where a single element class is considered, it is not necessary to obtain the classes of the element IT since a single activity and a single similarity threshold are then considered.

At the end of step E222, step E210 is returned to in order to process a following content element.

When no further element to be processed remains (negative of test E210), all the classes of elements are obtained at step E230.

Then, at step E240, a test is carried out to see whether an unprocessed class remains.

In the affirmative, it is determined at step E250 whether the similarity threshold particular to this class has decreased. If such is the case, the existing entries in the web feed 10 with which this class is associated are identified, and these entries in the class are grouped together during step E270. This grouping is illustrated below with reference to FIG. 6. After this grouping, step E240 is returned to in order to process a following class.

On the other hand, if the particular similarity threshold has not decreased, it is determined at step E260 whether this threshold has increased. If such is the case, the existing entries in the web feed 10 with which this class is associated are identified, and all or some of these entries in the class are separated during step E 280, described below with reference to FIG. 7. After this separation, step E240 is returned to in order to process a following class.

Finally, if the particular similarity threshold has remained constant (output no at step E260) step E240 is directly returned to.

When there is no longer any unprocessed class remaining, negative at step E240, the processing ends (step E290).

Figure 4:
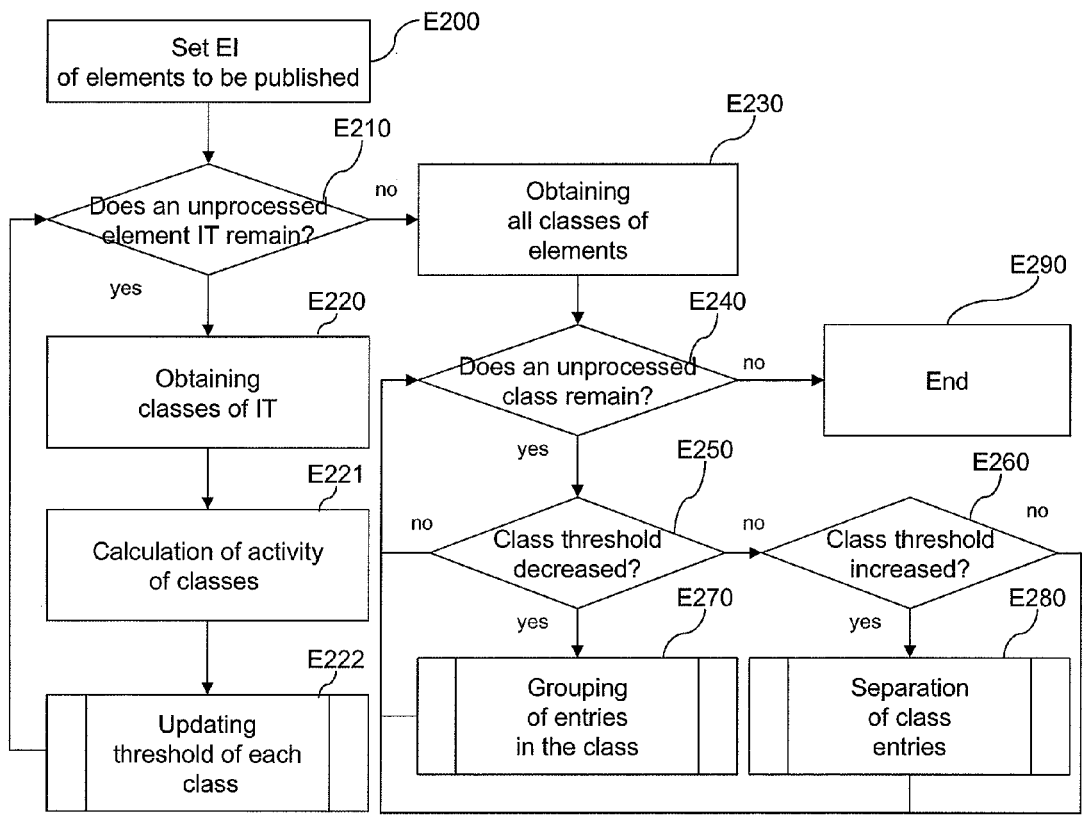
FIG. 4 shows, in the form of a flow diagram, steps of updating parameters related to the activity of receiving new content elements to be added to the feed, implemented during the generation of FIG. 3.

In a variant, the processing of FIG. 4 ends following the negative at step E210. This is because the operations of grouping existing entries or separation of elements of an existing entry involve modifying existing entries without adding a new content element to be published.

However, this may trouble the habitual user who, for example, seeing old (already seen) elements distributed in two entries, may wonder whether new contents have been added, or whether some contents that he has already consulted have been updated, whereas this is not the case. The presentation of the data may therefore prove to be not very intelligible for the user.

As a feed reader proposes a special display of any modified entry (that is to say generally describing a new element), it will be ensured that steps E230-E280 are used in the case where the stream reader that is used is known precisely (in this case, it is possible to verify the result produced at the interface during grouping or separation operations).

Figure 5:
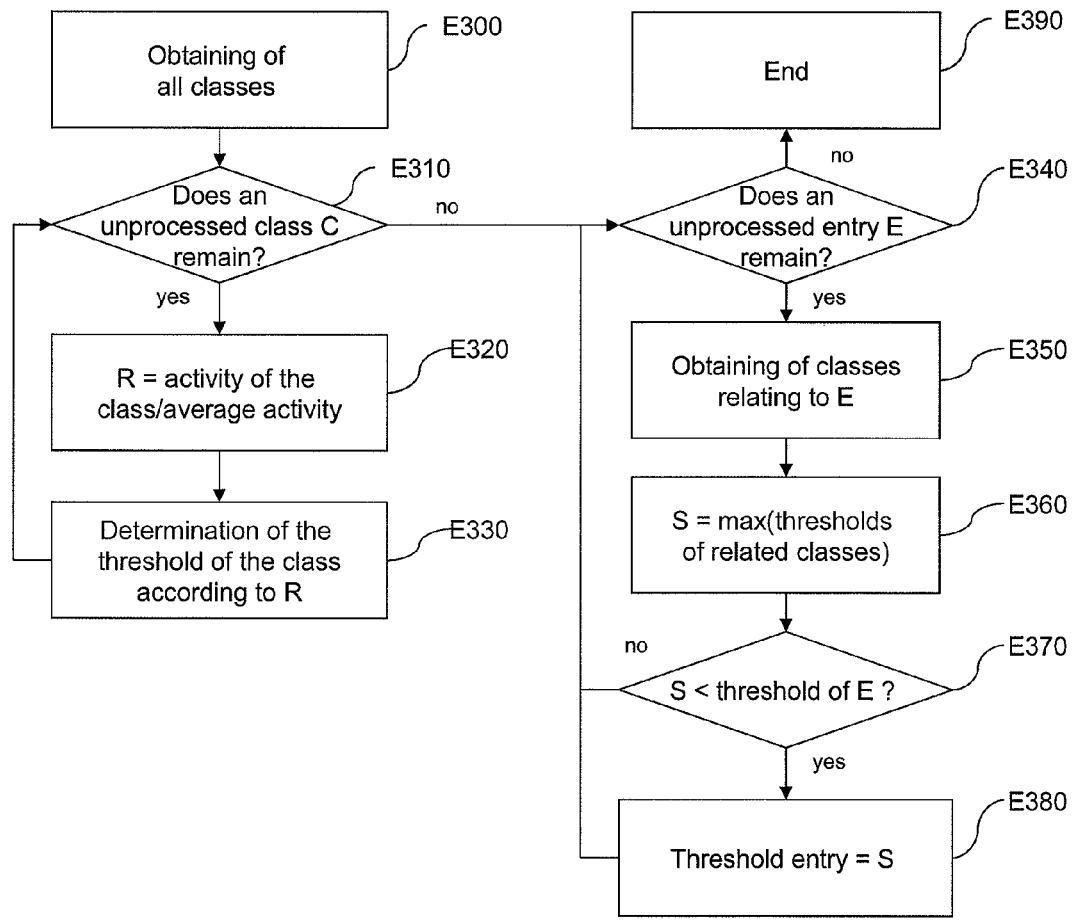
FIG. 5, shows, in the form of a flow diagram, steps of updating similarity thresholds, implemented during the processing operations of FIG. 4.

With reference now to FIG. 5, the updating E222 of the similarity threshold particular to each class begins at step E300 with the obtaining of all said classes. Next, at step E310, it is determined whether an unprocessed class C remains. In the affirmative, the ratio R between the activity of the class in question and the average activity for the different classes are calculated at step E320 (in particular the frequency of obtaining the contents to be published determined over the period T).

If this ratio R is greater than 1, this means that the class in question is characterized by a higher activity that average, and conversely, if the ratio is less that 1, a lower activity than average.

At step E330, a similarity threshold S associated with the ratio R is then determined.

In one embodiment, a lookup table may be available that associates a similarity threshold value S with several ranges of values of the ratio R.

By way of example, if the value of R is high (for example above 0.95), an associated similarity threshold S equal to 1 may be chosen in order to group only very similar elements, since there are many elements received for this class (the threshold is therefore kept high).

On the other hand, if the ratio R is lower (for example between 0.7 and 0.95), the associated threshold S is defined lower (for example 0.75).

By way of illustration, if it is considered that the similarity is evaluated from a category property of the element to be added, and the categories are hierarchical, on three levels, it is possible to define the following ranges R and associated thresholds S:

| R | S |
| --- | --- |
| R ≥ 0.95 | 1 |
| 0.50 ≤ R < 0.95 | 0.67 |
| 0 ≤ R < 0.50 | 0.33 |

In this example, since there are three hierarchy levels, it is considered that each level in common is equal to ⅓ in the similarity. Thus two contents elements sharing only the first category level have a similarity of 0.33, while two elements sharing the first two category levels have a similarity of 0.67. Finally, two elements sharing the three category levels have a similarity of 1.

The thresholds associated with R then correspond to these different cases (1, 2 or 3 common category levels), and lowering the threshold amounts to requiring one level less in order to be able to group an element with an entry.

In more general terms, if there are N hierarchical class levels, it is possible to take a distribution in the following form, in the case where the interval [P_MIN; P_MAX[ is divided into N−2 intervals of length L=(P_MAX−P_MIN)/(N−2), with P_MAX and P_MIN (<P_MAX) two limit values of the ratio R fixed for example at P_MAX=0.95 and P_MIN=0.50 in the previous example:

| R | S |
|---|---|
| R ≥ P_MAX | 1 |
| P_MIN + k * L ≤ R < P_MIN + (k + 1) * L $_{k\ integer\ \in\ [0;\ N-3]}$ | (k + 2)/N |
| 0 ≤ R < P_MIN | 1/N |

In the case where only two categories exist, only P_MIN and P_MAX need to be fixed.

Once the threshold S is determined for the current activity parameter R, this value is adopted as the new threshold for the class, and step E310 is returned to in order to check whether an unprocessed class C remains.

When all the classes have been processed (negative of step E310), it is determined whether an unprocessed entry E remains at step E340. In the affirmative, all the classes linked to E are obtained (step E350), and then the maximum value among the similarity thresholds of these classes is determined (step E360); this is because the values of these thresholds were able to change at step E330, and it is wished to take account of any such changes.

If the value S is below the similarity threshold associated with the current entry E (evaluated at step E370), then this value S is adopted as the new threshold of the entry E; this is because in this way it is certain that all the elements of this entry E comply with the threshold value. On the other hand, if such is not the case (negative at step E370), the processing continues at step E340, where it is determined whether an unprocessed entry E remains. When all the entries have been processed (negative at step E340), the processing ends at step E390.

In the case where a single class of elements is considered, instead of calculating a ratio R, the value of the activity during the period T is taken to determine an associated similarity threshold S.

In a variant, in the case where no similarity threshold associated with an entry is taken into account but the processing operations take account simply of a particular threshold per class, the value S associated with the ratio R is adopted as the new value of the threshold of the class only if the current threshold of the class is above the determined threshold S (the value of the class threshold is therefore decreased). In this way, it is certain that all the elements have a similarity greater than S.

Figure 10:
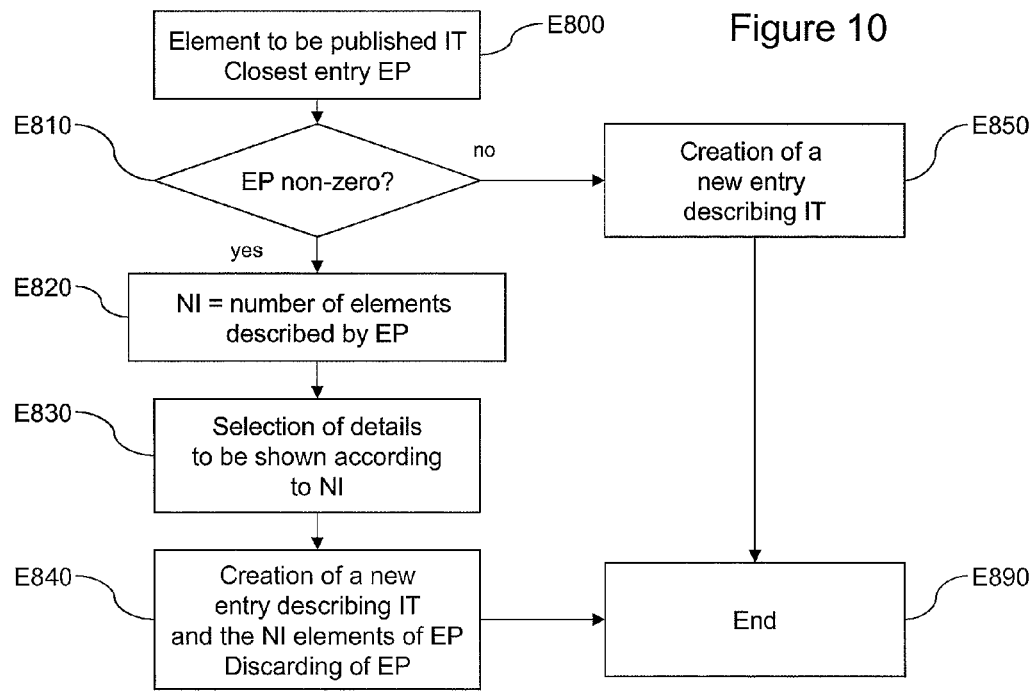
FIG. 10 shows, in the form of a flow diagram, steps of inserting a new content element in the web feed, implemented during the generation of FIG. 3.

In this case, in order to be able to increase the value of the similarity threshold of each class, it may be decided, when a new entry is created (in particular during the step E850 described below in relation to FIG. 10), to calculate the value of the ratio R on the basis of the entries of the feed 10, to derive the threshold S therefrom, and to take this threshold value S as the similarity threshold of the class.

This is because, for a new entry, the problem of preserving the coherence of the data (all the corresponding elements of the entry must satisfy the similarity threshold of the entry) is not posed since there exists, at this stage, only one element in the entry.

It can be observed that these various processing operations of updating the thresholds particular to the classes make it possible mainly to reduce the similarity threshold of the entries in question.

This limitation ensures a form of coherence of the data within each entry. This is because, if it is considered that there is a given threshold for an entry, it may be wished that all the elements of this entry comply with this similarity threshold of the entry. If the threshold is decreased, then any element already present in the entry necessarily has a similarity greater than or equal to the similarity threshold of the future elements added to the entry.

On the other hand, by increasing the similarity threshold, it may be that an element is added to an entry whereas the similarity threshold is low. Thus, subsequently, when this threshold increases, the element in question will no longer satisfy the current similarity threshold.

This is why, in a degraded mode of the invention (if there is no worry about this form of coherence of the data), it is possible to increase the similarity threshold of an entry 12, for example by taking the new threshold determined S even if it is not lower than the current threshold of the entry E (test E370 is omitted). In the case where a threshold is increased, provision is made for separating and distributing the elements of an entry into several entries if they all do not comply with the new similarity threshold, in a similar fashion to step E280 and as described below with reference to FIG. 7.

Figure 6:
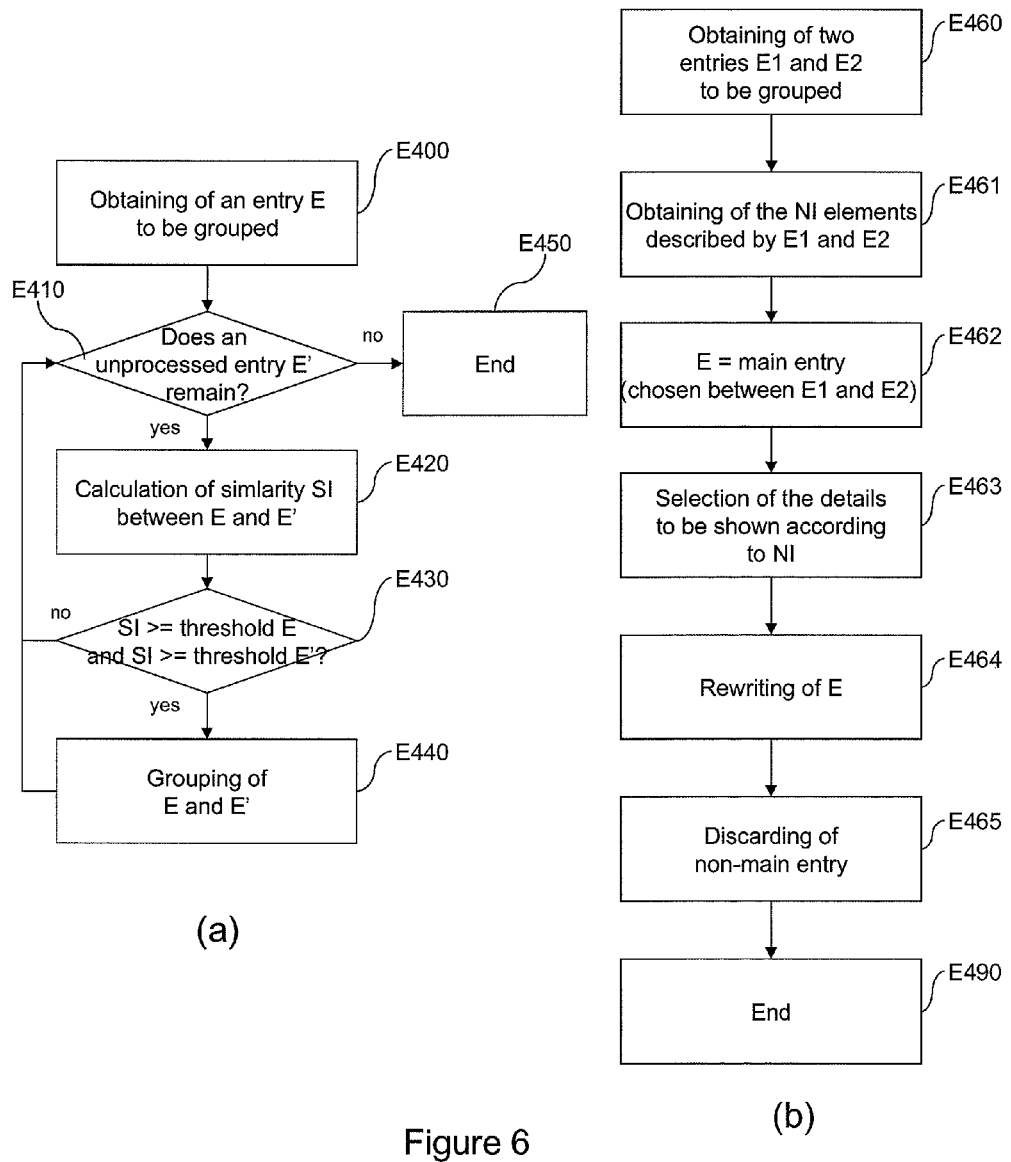
FIG. 6 shows, in the form of a flow diagram, steps of grouping entries, implemented during the processing operations of FIG. 4.
Figure 7:
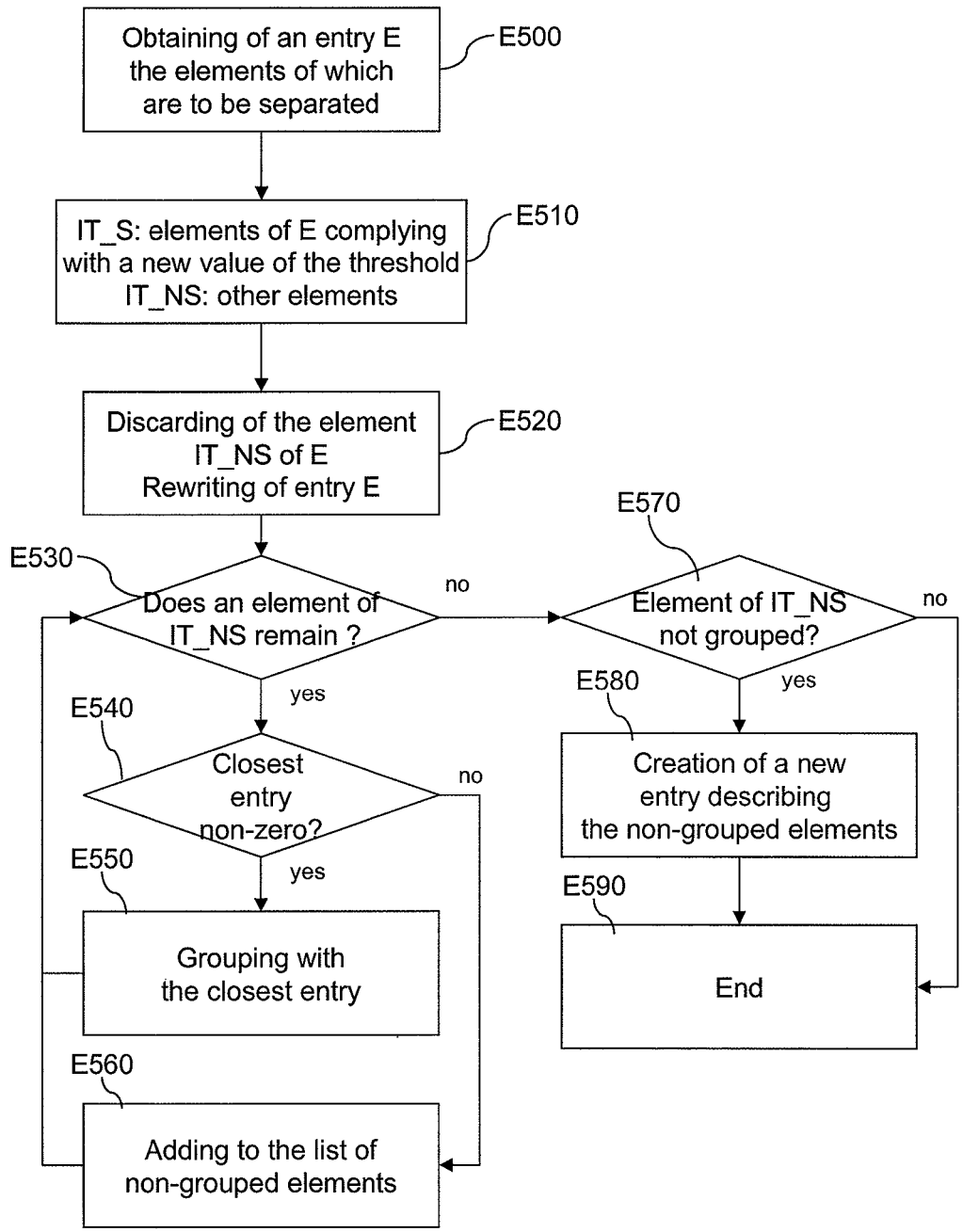
FIG. 7 shows, in the form of a flow diagram, steps of separating an entry, implemented during the processing operations of FIG. 4.

As mentioned previously in relation to FIG. 2, once the thresholds are updated, a grouping E270 or a separation E280 of the entries of the current class may be carried out to take into account the new threshold. FIG. 6 illustrates such a grouping, whereas FIG. 7 illustrates a separation.

The grouping of the entries comprises first of all the determination of the entries to be grouped with a given entry E (FIG. 6a) and then a grouping of each entry thus determined with the entry E (FIG. 6b).

The determination of the entries to be grouped with an entry E begins with the obtaining of such an entry E during step E400.

At step E410, it is evaluated whether an unprocessed entry, denoted E', remains in the web feed 10.

In the affirmative, the similarity between E and E' is calculated at step E420, for example using criteria as mentioned below in more detail. The similarity between two entries is for example determined by calculating the similarity of each element corresponding to each entry with the other entry, and then taking the average in order to obtain the similarity of the two entries.

Once the similarity between two entries E and E' has been obtained, it is determined at step E430 whether the entries E and E' have sufficient similarity with respect to the respective similarity thresholds of E and E'.

In the affirmative, this means that E and E' are sufficiently similar to be grouped together, both from the point of view of E and from the point of view of E', and then the grouping is carried out during step E440 (see FIG. 6b).

Other variants can be used for calculating the similarity between two entries, from the similarities between the corresponding elements of these entries: the minimum, the maximum or a weighted mean of these similarities can be taken.

The effective grouping of two entries (6b) begins at step E460 with the obtaining of two entries E1 and E2 to be grouped.

The NI elements described by E1 and E2 are determined at step E461.

At step E462, a principal entry E between E1 and E2 is chosen, typically the entry containing the most elements.

Next, according to the value of NI, the details to be represented in the entry E for each of the NI elements are selected (step E463). This step is similar to step E830 described below in relation to FIG. 10.

The entry E can then be rewritten with the appropriate level of detail including the elements of the two entries E1 and E2 (step E464), and then the non-principal entry can be deleted (step E465), following which the processing ends (step E490).

For its part, the separation processing of the elements corresponding to an entry 12 begins with the obtaining of an entry E at step E500 (FIG. 7).

It continues at step E510 with the determination of two sets: a first set, denoted IT_S, containing the content elements of the entry E complying with the new value of the similarity threshold of a class associated with the entry E or the entry E itself, and a second set, denoted IT_NS, containing the other elements of the entry.

To perform this step E510, the similarity of each of the elements corresponding to the entry E with the entry E itself is calculated: if this similarity is greater than the value of the similarity threshold (generally newly obtained), the element is added to the set IT_S, otherwise it is added to the set IT_NS.

Next, at step E520, the elements belonging to IT_NS of the entry E are taken out. This is because, since the value of the threshold for the entry has been increased, these elements no longer satisfy the similarity condition. The entry E thus keeps only the elements of IT_S.

The elements taken out are then processed, in order in particular to insert them in other entries or create new entries where applicable. Thus it is determined whether there remains an element belonging to IT_NS that is not processed (step E530).

Figure 8:
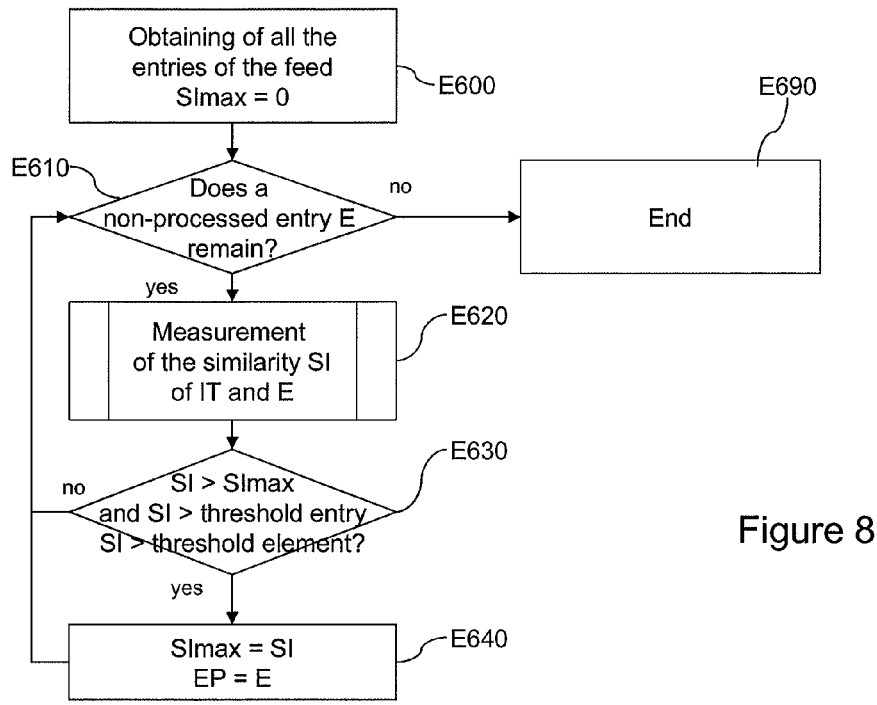
FIG. 8 shows, in the form of a computer diagram, steps of determining the entry closest to a content element to be added, implemented during the generation of FIG. 3.

If there remains such an unprocessed content element (affirmative at step E540), it is determined whether there exists a non-zero "closest" entry (step E540, a description of which is provided below in relation to FIG. 8).

If such is the case, the element in question is grouped together with this entry (step E550), otherwise it is added to a list of non-grouped elements (step E560). Following steps E550 and E560, step E530 is returned to.

When there is no longer an element belonging to IT_NS to be processed, it is determined whether there exist non-grouped elements in the list of the same name (step E570). If such is the case, a new entry describing the non-grouped elements is created (step E580).

In the negative at step E570 or following step E580, the processing ends (step E590).

Following such grouping and separation, the updating E110 of the parameters relating to the activity of receiving new content elements to be published ends.

A subsequent processing concerns the determination E130 of the entry EP closest to the element to be published IT. This determination can also be used at other moments, for example at step E540. This processing is now described in relation to FIG. 8.

It begins at step E600 with the obtaining of all the entries of the web feed 10 and the initialization to 0 of a variable, denoted SImax, representing the greatest similarity encountered.

At step E610, it is determined whether a non-processed entry E remains.

Figure 9:
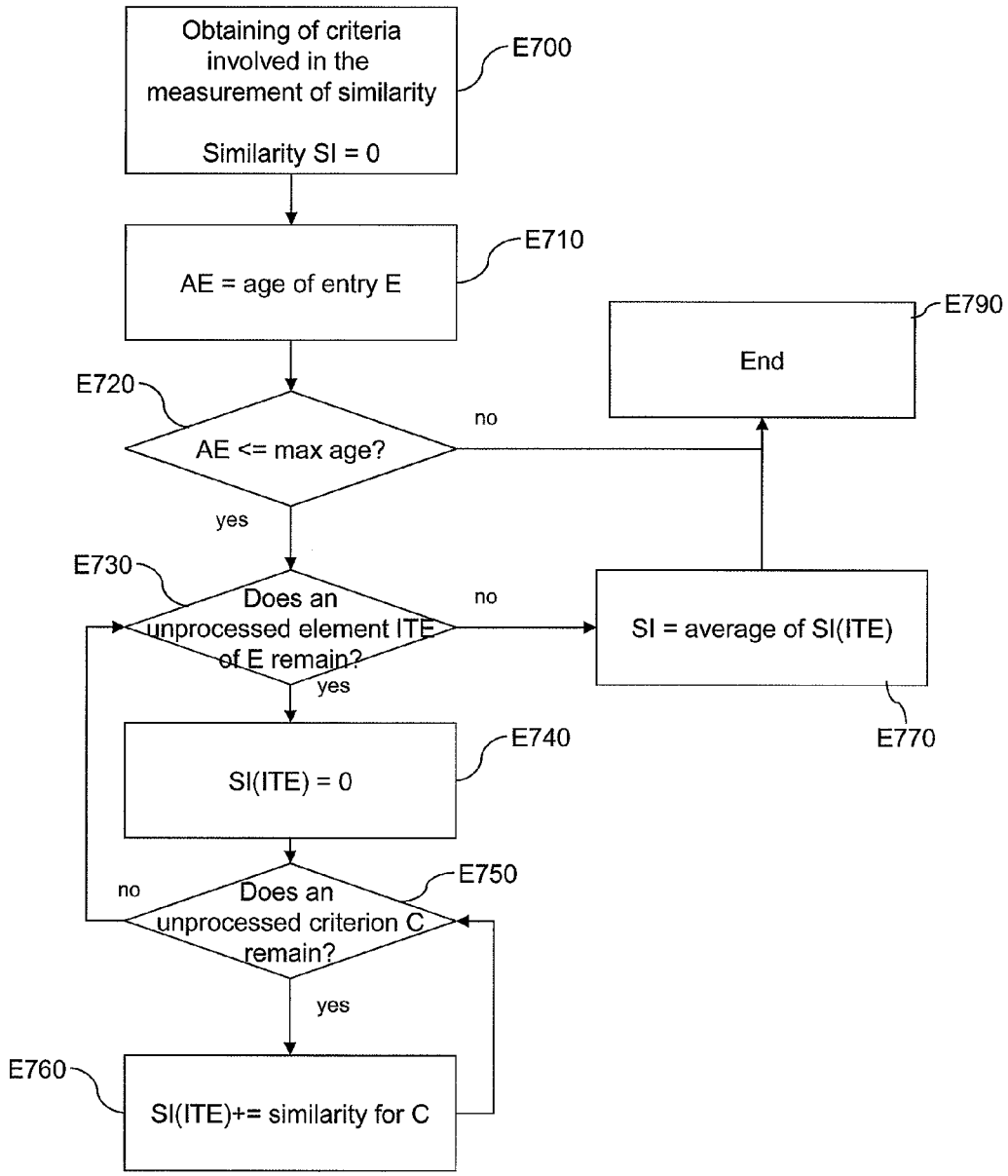
FIG. 9 shows, in the form of a flow diagram, steps of measuring a similarity value between a content element and an entry, implemented during the determination of FIG. 8.

In the affirmative, the similarity SI of the element to be published IT to the entry E is measured (step E620) as described now with reference to FIG. 9.

This measurement commences at step E700 with the obtaining of the criteria involved in the measurement of the similarity and the initialization to 0 of a variable, denoted SI (final result of step E620), representing the similarity of the element IT with the entry E studied. Examples of criteria (key words, category, etc) were cited previously.

At step E710, the age AE of the entry E is determined. A possible definition for the age of an entry consists of stating that this age is equal to the period elapsed since the creation of the oldest element described by the entry.

At step E720, it is determined whether the age of the entry is less than or equal to a maximum age accepted for an entry. This is because it may be relevant to define a maximum age in order not to describe, within the same entry, elements that were created at excessively remote times.

The value of this maximum age may depend on the activity valuation period T. In particular, a maximum age equal to T/2 or T/3 can for example be taken. If it is considered for example that T is equal 24 hours, a maximum age of 8 or 12 hours can for example be taken in order to ensure a minimum division of the day (if T equals 24 hours were taken, new entries would rarely be created, and each entry would contain more elements).

Thus the choice of the maximum age depends on the way in which it is wished to group the entries. A higher maximum age (that is to say close to T) favors the grouping of entries over a long period of time. On the other hand, a low maximum age (that is to say close to 0) favors the grouping of entries over short periods of time and therefore the effective suppression of the entries describing "old" elements after a time of availability in the web feed 10.

This is because, if a low maximum age is taken, the creation of new entries is favored since the interval of time during which an element can be added to an existing entry is of short duration. To take an example, if a content element is added every minute and there are 25 entries in a feed, the feed (without the invention) describes a period of 25 minutes.

With the invention, if it is assumed that there are 5 categories of element and that the maximum age is fixed at 10 minutes, it can be estimated that there are on average 2 elements per entry (addition of 10 elements in 10 minutes, for 5 categories). And, as the feed contains 25 entries, there are therefore 5 entries for each category, that is to say 50 elements described, for a period of 50 minutes. With a period of 1 hour, there are 12 elements per entry and a period of 5 hours described in the feed.

Therefore the value of the maximum age is chosen according to the behavior required, so as to exclude, from any calculation of similarity, the excessively "old" entries.

Returning to the processing, in the affirmative at step E720 (entry having an age less than the maximum age authorized), a concrete calculation of the similarity measured is carried out by determining first of all, at step E730, whether there remains an element ITE corresponding to this non-processed entry E.

In the affirmative, the similarity between the content element to be published IT and the current element ITE of this entry E, denoted SI(ITE), is initialized to 0 (step E740).

It is then tested, at step E750, whether there remains a non-processed criterion C among the criteria involved in the measurement of the similarity.

If such is the case, the similarity found for the criterion C between the element IT and the element ITE of the entry E is added to the value SI(ITE) (step E760). As mentioned previously, this similarity found can consist of a simple comparison between two corresponding properties of the two elements.

However, when the criteria involved in the measurement are defined, it is also possible to define their relative share so that, at a maximum, the sum of the criteria is equal to 1.

As described previously, if a criterion based on hierarchical categories with N levels is used, an importance of 1/N can be attributed for each level, and it is possible to commence by comparing the first level, and then continue as long as the categories are identical.

According to another example, it is possible to measure the similarity of the associated key words by calculating the ratio equal to the number of key words common to IT and to ITE, divided by the number of distinct key words associated with IT or ITE.

Finally, according to a last example, a criterion can be considered based on the addresses of the resources corresponding to the elements (which will for example be equal to 0.7 at a maximum), and a criterion based on the similarity of the titles (which for its part will be equal to 0.3).

Once the similarity measurement SI(ITE) has been updated at the end of step E760, step E750 is returned to in order to process the following criterion for the two current elements IT and ITE.

When there no longer remains any non-processed criterion C, step E770 is returned to in order to process a following element ITE of the current entry E.

When all the elements ITE have been processed (negative at step E730), the average of the similarity measurements SI(ITE) is allocated to the measurement of similarity SI between the element IT and the entry E (step E770).

If the age of the entry is greater than the maximum age (negative at step E720) or following the allocation of the value SI (step E770), the processing ends (step E790).

Returning to FIG. 8, once the measurement of similarity SI between the element IT and the entry E has been calculated, it is assessed, at step E630, whether the similarity SI obtained is greater than the value SImax, the similarity threshold for the entry E and the similarity threshold for the element IT (that is to say the maximum threshold among the particular thresholds of the classes to which this element IT belongs).

This is because, if the threshold SI calculated is not greater than SImax, then this means that another entry is more similar to the element IT. In addition, if the threshold SI calculated is not greater than the similarity threshold of the entry, then it is not possible to add the element IT to the entry E since it is not sufficiently similar to the elements described by this entry. Finally, if the threshold SI calculated is not greater than the similarity threshold of the classes to which it belongs, then this means that, for one of these classes, the activity is sufficiently great for a higher similarity to be required.

In the affirmative at step E630, the value SImax is updated with SI (step E640) and the current entry E is stored as being the closest entry EP.

Then step E610 is returned to in order to process the following entry E.

In the negative at step E630, step E610 is returned to directly.

When there no longer remains any unprocessed entry E (negative at step E610), the processing ends (step E690).

In a variant, if a threshold particular to each entry is not considered, it is merely necessary to check that SI is greater than SImax as well as greater than the threshold of the element (the maximum threshold of the thresholds peculiar to the associated classes).

A simpler embodiment of this processing can consist of selecting the best entry by means of the step E620 applied to each of the entries E, and then applying the test E630 to this single entry selected in order to return a closest entry EP. In this case, if the test E630 is negative, no entry EP is then returned. It can be seen here that the processing operations are simplified, in particular because step E630 is applied only once.

The final insertion of the content element IT in the web feed 10 is now described with reference to FIG. 10.

This insertion begins at step E800 for obtaining the element IT and the closer entry EP obtained previously.

If the entry EP is non-zero (tested at step E810), the number NI of elements described by this entry EP is determined at step E820. Then the details to be represented according to the value of NI are selected at step E830.

This selection of the details is justified by the need not to produce an excessively large web feed 10, in the light of its purpose. The level of details is therefore adapted to the number of elements to be represented.

In general terms, it is advantageous to eliminate the bulky properties (a summary, an image, etc). Concerning the smaller properties (title, category, date of duration, associated key words, etc), it may be advantageous to keep a maximum of them since they are liable to make the reading of the feed easier for a user.

By way of example, it is possible, in the case where NI is less than a first value (for example 3), to preserve the majority of the details of each element, in particular its title, the address at which the corresponding resource can be consulted, the category of this element or the associated key words if such properties exist, or a summary.

On the other hand, if there exists at least three elements already described by the entry, it is possible to opt for a lesser level of details, by discarding for example the summary. If it is wished to produce a truly compact feed, it is possible if necessary to merely keep the title and the address of the corresponding resource.

Once the details to be represented are selected, a new entry describing the new element IT to be published and the NI elements of EP are created at step E840.

For this purpose, it is in particular possible to choose, as the title of the entry, the title of the element IT, which is supplemented by the number of elements described in the entry. For example, if it is considered that the elements are articles, that the title of the element IT is "New title" and that the entry EP already describes 5 elements, it is possible to have a title of the form "New title [+5 other articles]".

It is also possible advantageously to add time information to this title (for example the date of addition of the most recent element), or even category or associated key word information. This is because all this information is liable to improve the legibility of the feed, and therefore assist users in identifying the contents that interest them.

In particular, in the case where all the elements described by an entry have common properties, for example belonging to the same category (or a common keyword), it is possible to add this information in the title of the new entry. All this information can in particular be included in an element <content> (the case of an Atom feed) or <description> (the case of an RSS feed).

The creation of the new entry made at step E840 is accompanied by the discarding to the entry EP, following which the processing ends (step E890). It is a case in particular of a replacement of the entry EP with the new entry created.

If the entry EP obtained is zero (negative at step E810), this means that the element IT cannot be added to an already existing entry. A new entry is then created describing this element IT during step E850. This creation is similar to the conventional creation of an entry from a content element. The title of the element is for example used as the title of the entry. This new entry is then inserted either in an available entry, or in place of an already existing entry, for example the oldest if it was published during at least one consultation period T.

Moreover, in the case where a similarity threshold particular to each entry is provided, the threshold of this new entry is equal to the threshold of the element IT, that is to say the maximum of the thresholds of the classes to which this element IT belongs.

Following this step, the processing ends (step E890).

Although provision was made above for a new entry describing both the element IT and the entry EP to be created, when the entry EP is not zero, this element IT can however be added directly in the entry EP during step E840, without the creation of a new entry taking the place of the entry EP in the feed 10. This is because, since the entry EP exists, it may seem more logical to simply add the element IT to this entry.

However, this solution may have a drawback in the way in which the feed is presented to the user. Depending on the feed reader used, the processing of the entries updated may vary: in certain cases, such entries are detected and displayed in a specific manner, which enables the user to see that a new element has been added; in other cases, the updating of these entries is not detected, and the user therefore does not see (unless he remembers that the previous title was different) that the entry has been updated. Consequently, in the general case, it is preferred to create a new entry (with a new particular identifier) since the feed readers almost all propose a specific display for the new entries, which guarantees that the users can easily identify the new contents.

In another variant, if the entry selected as being the closest EP is a void (or unused) entry, instead of creating it according to the prior art, it is possible to create it as described by steps E820, E830 and E840. Thus, even if the entry EP contains only one element, its format would be similar to that of an entry containing several elements, improving the legibility of the feed.

An example of application of the regulation according to the invention is now presented, and in particular its use in the context of the FeedSync extension is provided for the RSS and Atom formats.

The FeedSync extensions enable synchronization of different versions of a feed representing the same information. Thus, if an Atom feed is used to describe a collection of photographs, it may happen that the stream is downloaded onto a portable computer or telephone. Once this stream is downloaded, certain applications make it possible, from a given terminal, to display the collection of photographs without being connected to the internet, and to modify the collection by adding or deleting photographs for example.

In this case, the application will modify the feed locally, and FeedSync proposes a way of describing the modifications made in order to allow any subsequent synchronization with the web feed on the source server.

At the same time, it may happen that the feed present on the server is also modified, the modifications also being described with the FeedSync syntax, so that it is possible to synchronize the version of the feed present on a terminal of the user and the version present on the server.

On the other hand, if the local version and the version on the server have been modified without using a common standard such as FeedSync, then it is particularly difficult, or even impossible, to synchronize the data.

Since FeedSync makes it possible to describe the modifications made on entries of a feed, it is possible to use it to indicate the changes made in the context of the invention. In this case, since there is a standard for expressing these changes, the problems relating to the interpretation of the updated feed by the feed reader are reduced. Consequently, in the case where the feed in question supports FeedSync, it is possible to use the updating of entries instead of the creation of new entries when a new element to be published is inserted (FIG. 10), existing entries are grouped (FIG. 6) and the elements of an entry are separated (FIG. 7).

FIG. 11 shows this application by the representation of an entry supplied in the example of FIG. 2d, and for which the updates were made in compliance with the format proposed by FeedSync.

In particular, it will be noted that each update (including the creation of the entry) is indicated by an element "sx:history", which is characterized by a sequence number, an updating date and an identifier of the end point that made the update. In addition, it should be emphasized that these data are contained in an element "sx:sync", the identifier of which (here EN001) must not change along with the updates, which does not however prevent the identifier of the Atom entry from changing.

Figure 12:
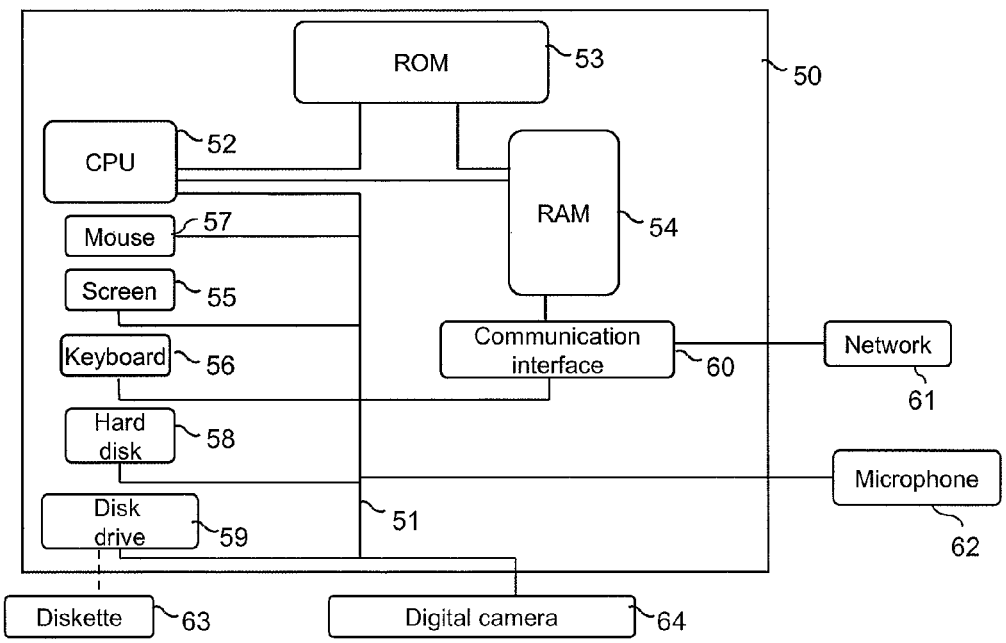
FIG. 12 shows a particular hardware configuration of a web feed generation device able to implement the method according to the invention.

With reference now to FIG. 12, there is described by way of example a particular hardware configuration of a device or system for generating a web feed suitable for implementation of the method according to the invention.

An information processing device implementing the invention is for example a microcomputer 50, a work station, a personal assistant, or a mobile telephone connected to various peripherals. According to yet another embodiment of the invention, the device is in the form of a photographic apparatus provided with a communication interface for allowing connection to a network.

The peripherals connected to the device according to the invention comprise for example a digital camera 64, or a scanner or any other means of acquiring or storing images, connected to an input/output card (not shown) and supplying data to the device.

The device 50 comprises a communication bus 51 to which there are connected:
- a central processing unit CPU 52 in the form for example of a microprocessor;
- a read only memory 53 in which there can be contained the programs the execution of which enable the method according to the invention to be implemented. This may be a flash memory or EEPROM;
- a random access memory 54 which, after the powering up of the device 50, contains the executable code of the programs of the invention necessary for implementing the invention. This random access memory 54 is of the RAM type (with random access), which offers rapid access compared with the read only memory 53;
- a screen 55 for displaying data, in particular video, and/or serving as a graphical interface with the user, who can thus interact with the programs of the invention, by means of a keyboard 56 or any other means such as a pointing device, such as for example a mouse 57 or optical pen;
- a hard disk 58 or a storage memory, such as a memory of the compact flash type, able to contain the programs of the invention as well as data used or produced during the implementation of the invention;
- a optional disc drive 59, or other reader for a removable data carrier, adapted to receive a diskette 63 and to read/write thereon data processed or to be processed in accordance with the invention; and
- a communication interface 60 connected to the telecommunication network 61, the interface 60 being able to transmit and receive data, in particular to transmit the web feed generated by the invention.

The communication bus 51 allows communication and interoperability between the various elements included in the device 50 or connected thereto. The representation of the bus 51 is not limitative and in particular the central unit 52 is able to communicate instructions to any element of the device 50 directly or by means of another element of the device 50.

The diskettes 63 can be replaced by any information carrier such as for example a compact disk (CD-ROM), rewritable or not, a ZIP disk or a memory card. In general terms, an information storage means, able to be read by a microcomputer or a microprocessor, integrated or not in the web feed generation device, possible removable, is adapted to store one or more programs the execution of which enables the method according to the invention to be implemented.

The executable code enabling the web feed generation device to implement the invention can be stored either in read only memory 53, or on the hard disk 58 or on a removable digital medium such as for example a diskette 63 as described previously. According to a variant, the executable code of the programs is received by means of the telecommunication network 61, via the interface 60, so as to be stored in one of the storage means of the device 50 (such as the hard disk 58 for example) before being executed.

The central unit 52 controls and directs the execution of the instructions or portions of software code of the program or programs of the invention, the instructions or portions of software code being stored in one of the aforementioned storage means. When the device 50 is powered up, the program or programs that are stored in a non-volatile memory, for example the hard disk 58 or read only memory 53, are transferred into the random access memory 54, which then contains the executable code of the program or programs of the invention, as well as registers for storing the variables and parameters necessary for implementing the invention.

It should also be noted that the device implementing the invention or incorporating it can also be produced in the form of a programmed apparatus. For example, such a device can then contain the code of the computer program or programs in a fixed form in an application specific integrated circuit (ASIC).

The device or system described here and in particular the central unit 52 are able to implement all or some of the processing operations described in relation to FIGS. 2 to 11, in order to implement the methods that are the subject of the present invention and constitute all or some of the systems that are the subject of the present invention.

The above examples are merely embodiments of the invention, which is not limited thereby.

In particular, though it has been possible to present the invention by apprehending the content elements class by class, it may happen that the activities relating to certain distinct classes remain very small despite the reduction in the similarity threshold relating to each of these classes. It is then possible to envisage an improvement aimed at reducing the number of entries 12 used for these different classes, in particular by considering these smallest classes (for example the two smallest, or those below a minimum threshold value) as being a single class. Thus the content elements of these various classes are grouped together in the same type of entry 12.

Moreover, with reference to FIG. 9, an additive contribution of the various similarity classes (addition of step E760) has been mentioned. In a variant, this contribution may be a multiplication between the various partial similarities.

In such a case, the partial similarity for each criterion is measured by a value between 0 and 1 and these various values are multiplied to obtain SI. Moreover, at step E700, the value SI is then initialized to 1, and at step E760 the operation is a multiplication "*" rather than an addition "+".

This variant is advantageous if two independent criteria are used simultaneously: for example a criterion based on key words and a criterion based on the address of the resources.

The invention claimed is:

1. A method of generating a syndication web feed composed of entries corresponding to content elements, comprising:
   determining at least one activity parameter representing a quantity of new content elements to be published in the web feed that arrive in a given interval of time;
   calculating at least one similarity value between a new content element to be published in the web feed and at least one existing entry in said web feed;
   deciding whether or not to group the new content element with an existing entry in said web feed, comprising (i) selecting an existing entry in said web feed, if any, that has a calculated similarity value with the new content element greater than a similarity threshold, said similarity threshold being adjusted in accordance with the at least one determined activity parameter such that the similarity threshold increases when the at least one determined activity parameter decreases and the similarity threshold decreases when the at least one determined activity parameter increases, and (ii) making the decision with regard to the selected existing entry by determining whether or not the calculated similarity value is above or below the adjusted similarity threshold; and
   adding said new content element to be published to said selected existing entry of the web feed, if any, in a case where the deciding step decides to group the new content element with the selected existing entry, and otherwise adding said new content element to be published in the web feed as a new entry in a case where the deciding step decides not to group the new content element with an existing entry.

2. The method according to claim 1, wherein selecting said existing entry comprises comparing the calculated similarity value with at least one similarity threshold that depends on said activity parameter.

3. The method according to claim 2, wherein selecting the existing entry further comprises determining the entry having a greatest similarity value with the new content element to be published, the greatest similarity value being higher than at least one similarity threshold relating to the selected entry.

4. The method according to claim 2, wherein said at least one similarity threshold increases when a frequency of obtaining the content elements to be published decreases.

5. The method according to claim 2, wherein said at least one similarity value is calculated from at least one content element attribute chosen from a set comprised of a title, a web address at which the content element can be consulted, a key word, a content category and information on the origin of the content element.

6. The method according to claim 1, wherein a particular similarity threshold is associated with each entry in the web feed, and selecting the existing entry comprises comparing at least one said similarity value calculated for an entry, with said particular threshold associated with the entry.

7. The method according to claim 1, wherein said new content elements are organized by classes and at least one of said classes is associated with each entry in the web feed according to the content elements corresponding to the entry,
   wherein there is associated, with each class, a class similarity threshold that depends on an activity parameter relating to said class, and wherein selecting the existing entry depends on the class similarity thresholds.

8. The method according to claim 7, wherein the class similarity threshold associated with a class is updated according to a ratio between the activity parameter relating to said class and an average activity parameter relating to an average activity of all the classes.

9. The method according to claim 7, further comprising grouping entries associated with a class in the same entry when the class similarity threshold associated with the class decreases.

10. The method according to claim 7, further comprising splitting an entry associated with a class into a plurality of entries when the class similarity threshold associated with the class increases.

11. The method according to claim 10, wherein the content elements corresponding to said entry to be separated are split into a first group of content elements whose similarity with said entry is greater than or equal to a new increased similarity threshold, and a second group of content elements whose similarity of value is below the new increased similarity threshold.

12. The method according to claim 7, further comprising grouping, in the same entry of the web feed, several entries whose associated activity parameters are the lowest.

13. The method according to claim 1, wherein the content elements are organized in hierarchical categories, and said similarity value with an entry corresponds to a number of hierarchical levels in common between a new content element and at least one content element corresponding to said entry.

14. The method according to claim 1, wherein selecting the existing entry further depends on an indication of seniority of the entries in said web feed.

15. A non-transitory computer readable storage medium, able to be read by a computer system, comprising computer executable instructions for a computer program adapted to implement the method according to claim 1 when the program is loaded into and executed by the computer system.

16. A device for generating a syndication web feed composed of entries corresponding to content elements, comprising:
a determination means constructed to determine at least one activity parameter representing a quantity of new content elements to be published in the web feed that arrive in a given interval of time;
a calculation means constructed to calculate at least one similarity value between a new content element to be published in the web feed and at least one existing entry of said web feed;
a deciding means constructed to decide whether or not to group the new content element with an existing entry in said web feed, comprising (i) selecting an existing entry of said web feed, if any, that has a calculated similarity value with the new content element greater than a similarity threshold, said similarity threshold being adjusted in accordance with the at least one determined activity parameter such that the similarity threshold increases when the at least one determined activity parameter decreases and the similarity threshold decreases when the at least one determined activity parameter increases, and (ii) making the decision with regard to the selected existing entry by determining whether or not the calculated similarity value is above or below the adjusted similarity threshold; and
an addition means constructed to add said new content element to be published to said selected existing entry of the web feed, if any, in a case where the deciding means decides to group the new content element with the selected existing entry and otherwise adding said new content element to be published in the web feed as a new entry in a case where the deciding means decides not to group the new content element with an existing entry.

* * * * *